(12) United States Patent
Allen

(10) Patent No.: US 8,237,300 B2
(45) Date of Patent: Aug. 7, 2012

(54) GENSET POWER SYSTEM HAVING MULTIPLE MODES OF OPERATION

(75) Inventor: Timothy P. Allen, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 690 days.

(21) Appl. No.: 12/320,927

(22) Filed: Feb. 9, 2009

(65) Prior Publication Data

US 2010/0156117 A1    Jun. 24, 2010

Related U.S. Application Data

(60) Provisional application No. 61/193,738, filed on Dec. 19, 2008.

(51) Int. Cl.
*F02D 41/08* (2006.01)

(52) U.S. Cl. .................................................. 290/40 C

(58) Field of Classification Search ............... 290/40 C, 290/40 B, 40 R, 4 R; 700/287, 288
See application file for complete search history.

(56) References Cited

U.S. PATENT DOCUMENTS

| | | | |
|---|---|---|---|
| 4,651,081 A | 3/1987 | Nishimura et al. | |
| 5,198,698 A | 3/1993 | Paul et al. | |
| 5,332,927 A * | 7/1994 | Paul et al. | 307/66 |
| 5,347,966 A * | 9/1994 | Mahon et al. | 123/179.21 |
| 5,614,809 A | 3/1997 | Kiuchi et al. | |
| 6,459,166 B2 | 10/2002 | Yanase et al. | |
| 6,483,198 B2 | 11/2002 | Schmitz et al. | |
| 6,534,958 B1 * | 3/2003 | Graber et al. | 322/11 |
| 6,952,642 B1 | 10/2005 | Cowen | |
| 7,064,454 B2 | 6/2006 | Fukaya et al. | |
| 7,170,262 B2 | 1/2007 | Pettigrew | |

* cited by examiner

*Primary Examiner* — Dang Le
(74) *Attorney, Agent, or Firm* — Finnegan, Henderson, Farabow, Garrett & Dunner LLP

(57) ABSTRACT

A power system is disclosed. The power system may have an engine, a generator, a monitoring device configured to monitor the generator and to generate a signal, and a performance module configured to provide an alarm and a shutdown command to the engine based on the signal. The power system may further have a switching device with a first condition and a second condition. When the first condition of the switching device is active, the performance module may be overridden, the engine may be operated at a reduced speed and load output, and the generator may be inhibited from producing electrical power. When the second condition of the switching device is active, the performance module may affect operation of the power system, the engine may be operated at an elevated speed and load output, and the generator may be allowed to produce electrical power directed to the external load.

20 Claims, 2 Drawing Sheets

GENSET POWER SYSTEM HAVING MULTIPLE MODES OF OPERATION

RELATED APPLICATIONS

This application is based on and claims the benefit of priority from U.S. Provisional Application No. 61/193,738 by Timothy P. Allen, filed Dec. 19, 2008, the contents of which are expressly incorporated herein by reference.

TECHNICAL FIELD

The present disclosure relates generally to a generator set (genset) power system, and more particularly, to a genset power system having multiple modes of operation.

BACKGROUND

A generator set (genset) includes a combination of a generator and a prime mover, for example a combustion engine. As a mixture of fuel and air is burned within the engine, a mechanical rotation is created that drives the generator to produce electrical power. Ideally, the engine drives the generator continuously with a relatively constant torque and speed, and the generator accordingly produces an electrical power output having relatively constant characteristics (frequency, voltage, etc.).

Gensets can be used as a backup or a sole source of power. For example, a primary source of power such as a utility grid is typically connected to supply a load with power for critical use, for example, to supply a hospital or a manufacturing facility with power. When the primary source of power fails, the genset is brought online to provide backup power for the critical use. And, when the primary source of power is reconnected to supply power for the critical use, the genset is shutdown. In another example, a genset can be used as the only source of power such as in a manufacturing facility or at a worksite remote from utility power. In these situations, the genset may be operated for extended periods of time such as during a work shift, and then shut down during the night; used at night, and then shut down during the day; or used only during a particular time of the year.

As either a backup or primary source of power, a genset can sit in a shutdown condition for extended periods of time between operations. During this time, the genset may cool undesirably. If started and immediately ramped to full operation in this condition, accelerated wear may occur as a result of the cooling. Thus, a means for warming the genset in preparation for operation or maintaining warmth of the genset between operations may be desired to extend the life of the genset.

An exemplary system for warming a genset is described in U.S. Pat. No. 5,198,698 (the '698 patent) issued to Paul et al. on Mar. 30, 1993. Specifically, the '698 patent discloses an auxiliary power supply system that includes an internal combustion engine driving an alternator to provide electrical power to DC bus lines, across which a storage battery is connected. When a voltage across the bus lines drops below a selected value, the engine is turned on for a period of time to warm it up, during which time the power from the generator is not supplied to the DC bus lines. The time during which the engine is running without power being delivered from the generator is selected to allow the engine to warm up to a desired operating temperature before it is fully loaded.

Although the system of the '698 patent may be helpful in warming a genset under certain conditions, it may be less than optimal. That is, the system may not have the appropriate controls, alarms, and shutdown triggers required to properly protect the genset under varying conditions, or the ability to override these mechanisms during the warmup time period. Further, the system of the '698 patent may not provide for operation in the warmup mode during extended periods of time when power from the genset is not required.

SUMMARY

One aspect of the present disclosure is directed to a power system. The power system may include an engine, and a generator mechanically driven by the engine to produce electrical power directed to an external load. The power system may also include a monitoring device configured to monitor a performance of the generator and to generate a signal indicative of the performance, a performance module configured to selectively provide at least one of an alarm and a shutdown command to the engine based on the signal from the monitoring device, and a switching device having at least a first condition and a second condition. When the first condition of the switching device is active, output from the performance module may be overridden, the engine may be operated at a reduced output, and the generator may be inhibited from producing electrical power. When the second condition of the switching device is active, the performance module may be allowed to affect operation of the power system, the engine may be operated at an elevated output, and the generator may be allowed to produce electrical power directed to the external load.

In another aspect, the present disclosure is directed to a method of providing power. The method may include combusting a mixture of fuel and air to create a mechanical output, converting the mechanical output to electrical power, monitoring a characteristic of the electrical power, and generating at least one of an alarm and a shutdown command based on the monitored characteristic. The method may also include overriding the at least one of the alarm and the shutdown command, reducing the mechanical output, and inhibiting the conversion of mechanical output to electrical power during a first mode of operation. The method may further include affecting at least one of the combusting and the converting based on the at least one of the alarm and the shutdown command, increasing the mechanical output, and allowing the conversion of mechanical output to electrical power during a second mode of operation.

DETAILED DESCRIPTION

Figure 1:
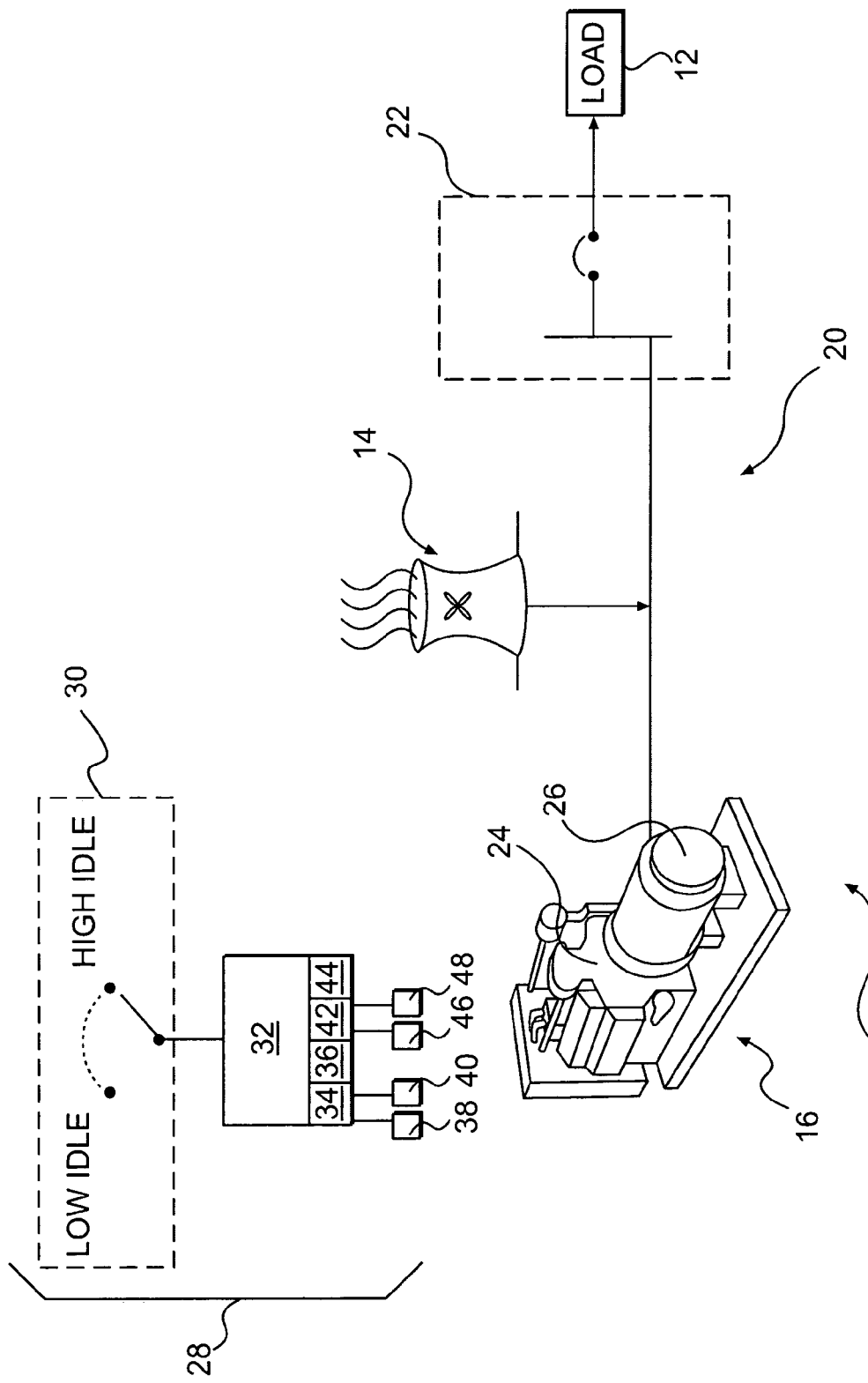
FIG. 1 is a diagrammatic illustration of an exemplary power system.

FIG. 1 illustrates an exemplary power system 10 consistent with certain disclosed embodiments. Power system 10 may be configured to provide backup power to an external load 12. In one exemplary embodiment, backup power may include an immediate supply of reserve power provided to external load 12 when power supplied from a utility power grid 14 is interrupted. It is contemplated, however, that in some embodiments, power system 10 may be configured as a primary or sole source of power, if desired. As shown in FIG. 1, power system 10 may include one or more generator sets (gensets) 16 connected to external load 12 by way of a power transmission network 20 and a connection 22.

Utility power grid 14 may be an electricity generation and/or distribution system that generates and delivers electrical power through a centralized power grid. In one embodiment, utility power grid 14 may be configured as the primary source of power for external load 12. For example, utility power grid 14 may include a nuclear-generated electrical power plant, a wind-powered generator, a solar-powered generator, a hydroelectric power plant, etc. In one exemplary embodiment, utility power grid 14 may be a fee-based electricity generation and/or distribution system that provides electrical power to one or more customers. In another exemplary embodiment, utility power grid 14 may be a mobile, self-supporting, electricity generation and/or distribution system such as, for example, a machine (e.g., construction equipment and/or agricultural equipment) or motorized vehicle (e.g., a bus or a truck). One skilled in the art will appreciate that utility power grid 14 may produce electrical power in multiple phases and/or different frequencies based upon requirements of external load 12. In one example, utility power grid 14 may produce and/or supply electrical power in the form of an alternating electric current such as, for example, three-phase alternating current with a preset frequency (e.g., 50 Hz, 60 Hz, or any other suitable frequency).

External load 12 may include any type of power consuming system or device configured to receive electrical power supplied by utility power grid 14 and to utilize the electrical power to perform some type of task. External load 12 may include, for example, lights, motors, heating elements, electronic circuitry, refrigeration devices, air conditioning units, computer servers, etc. In one exemplary embodiment, external load 12 may include one or more systems and/or devices that utilize uninterrupted electrical power to perform one or more critical and/or sensitive tasks. For example, electrical loads 12 that utilize uninterrupted power may include those found in hospitals, airports, computer servers, telecommunication installations, and/or industrial applications.

Transmission network 20 may embody any electrical transmission system for distributing electrical power generated by utility power grid 14 to external load 12. For example, transmission network 20 may include a system comprised of power stations, transmission lines, connection equipment (e.g., transformers, electrical switches, power relays, circuit breakers, and the like), and other suitable devices for distributing electrical power across a power grid. In one embodiment, portions of transmission network 20 may be buried underground and/or run overhead via transmission towers.

Connection 22 may include any type of electrical connector or system that is capable of coupling together one or more of genset 16, utility power grid 14, and/or external load 12. For example, connection 22 may include various junction boxes, circuit interrupting devices, fuses, or any other components that may be suitable for electrically interconnecting one or more systems. Connection 22 may also or alternatively include a voltage transformer configured to reduce or otherwise condition the voltage of power provided by genset 16 and/or utility power grid 14 to a suitable level for use by conventional consumer devices.

Genset 16 may include any component or components that operate to generate electricity. In one embodiment, genset 16 may comprise a prime mover 24 coupled to mechanically rotate a generator 26 that provides electrical power to external load 12. For the purposes of this disclosure, prime mover 24 is depicted and described as a heat engine, for example an internal or external combustion engine that combusts a mixture of fuel and air to produce the mechanical output. One skilled in the art will recognize that prime mover 24 may be any type of combustion engine such as, for example, a diesel engine, a gasoline engine, or a gaseous fuel-powered engine. As such, prime mover 24 may have a desired operating range and, when operating within this range, performance of prime mover 24 may be substantially consistent and efficient, and the electrical output of generator 26 may have characteristics (e.g., voltage, frequency, etc.) that are substantially consistent. In one example, the desired operating range may be associated with a rotational speed of prime mover 24. When the speed of prime mover 24 decreases below the desired operating range, prime mover 24 may be considered to be lugging and the quality and/or magnitude of electrical output from generator 26 may degrade. Similarly, when the speed of prime mover 24 increases above the desired operating range, prime mover 24 may be considered to be overspeeding and the quality and/or magnitude of electrical output from generator 26 may again degrade.

Generator 26 may be, for example, an AC induction generator, a permanent-magnet generator, an AC synchronous generator, or a switched-reluctance generator that is mechanically driven by prime mover 24 to produce electrical power. In one embodiment, generator 26 may include multiple pairings of poles (not shown), each pairing having three phases arranged on a circumference of a stator (not shown) to produce an alternating current in an associated rotor is mechanically driven to rotate by prime mover 24. Electrical power produced by generator 26 may be directed for offboard purposes to external load 12.

To help regulate operation of prime mover 24 and generator 26, power system 10 may include a control system 28. Control system 28 may include, among other things, a switching device 30, engine control components, generator control components, and a controller 32 in communication with switching device 30, and the engine and generator control components to regulate operation of prime mover 24 and generator 26 in response to a condition of switching device 30.

Switching device 30 may be an automatic or manual device movable from a first position to at least a second position to signal a desire for a first condition or a second condition of genset 16 to be active. In one example, the first condition may be a low-idle mode of operation, while the second condition may be a high-idle mode of operation. The low-idle mode of operation may be associated with a genset warming or temperature maintaining process, wherein genset 16 is lightly loaded until particular conditions are satisfied. In one example, the particular conditions may be associated with a temperature of prime mover 24. In another example, the particular conditions may be associated with an elapsed period of time after startup of prime mover 24. In yet another example, the particular conditions may be associated with manual movement of switching device 30 from the first position to the second position (i.e., operation of genset 16 may remain in the low-idle mode until an operator manually moves switching device from the first position to the second position). In some instances, genset 16 may remain in the low-idle mode of operation for extended periods of time, for example overnight or between times of required electrical output. The high-idle mode of operation may be associated with electrical power output of genset 16 according to a demand of external load 12, after the particular conditions mentioned above have been satisfied. Controller 32 may regulate operation of genset 16 in the low- and high-idle modes of operation via communication with the engine and generator control components.

The engine control components may include one or more monitoring devices associated with engine performance and/or status, a performance module 34 reactive to signals from the monitoring devices, and a performance regulator 36 operated by controller 32 to regulate performance of prime mover 24 based on signals from the monitoring devices and/or performance module 34. In one example, the monitoring devices may include one or more sensors, for example a temperature sensor 38, a speed sensor 40, a coolant level sensor (not shown), a fuel level sensor (not shown), an oil pressure sensor (not shown), a battery charge sensor (not shown), an air cleaner sensor (not shown), and other sensors known in the art. Each of these sensors may be configured to sense a performance, operation, and/or status of components of prime mover 24, and to generate a corresponding signal.

Based on the signals from the monitoring devices, performance module 34 may be configured to selectively provide an alarm and/or a shutdown command intended to protect components of power system 10. In particular, based on a low or high engine temperature, speed, coolant level, fuel level, oil pressure, battery charge, air cleaner restriction, etc., performance module 34 may generate a visual and/or audible warning or even an engine shutdown command directed to prime mover 24. Further, based on sensed information from the monitoring devices, particularly from temperature sensor 38, performance module 34 may request that controller 32 selectively activate the low- or high-idle modes of operation.

Performance regulator 36 may be configured to regulate operation of prime mover 24 based on input from the monitoring devices, performance module 34, and/or from controller 32. For example, when in the high-idle mode of operation, based on signals from speed sensor 40, performance regulator 36 may affect a fueling of prime mover 24 to thereby increase or decrease an output speed of prime mover 24 (i.e., an input speed of generator 26). In addition, based on the alarms and/or shutdown requests from performance module 34, performance regulator 36, under direction of controller 32, may change (e.g., reduce or increase) or even completely inhibit fueling of prime mover 24. Further, based on commands from controller 32 during the low-idle mode of operation, performance regulator 36 may selectively override the signals from the monitoring devices and/or from performance module 34, and regulate operation of prime mover 24 to selectively warm prime mover 24 at reduced output (i.e., prime mover 24 may be operated at reduced output without certain alarms and shutdown commands being issued or affecting operation of prime mover 24). It should be noted that any of performance module 34, performance regulator 36, and controller 32 may be integrated into a single control component, if desired.

The generator control components, similar to the engine control components, may include one or more monitoring devices associated with generator performance and/or status, a performance module 42 reactive to signals from the monitoring devices, and a performance regulator 44 operated by controller 32 to regulate performance of generator 26 based on signals from the monitoring devices and/or from performance module 42. In one example, the monitoring devices may include sensors, for example a temperature sensor 46, an electrical output sensor 48 (e.g., a current sensor, a voltage sensor, a frequency sensor, or other electric power characteristic sensor), and other sensors known in the art. Each of these sensors may be configured to sense a performance, operation, and/or status of generator 26, and generate a corresponding signal.

Based on the signals from the monitoring devices, performance module 42 may be configured to selectively provide an alarm and/or a shutdown command intended to protect components of power system 10. In particular, based on a low or high bearing and/or winding temperature, current, voltage, frequency, etc., performance module 42 may generate a visual and/or audible warning or even a shutdown command directed to prime mover 24.

Performance regulator 36 may be configured to regulate operation of generator 26 based on input from the monitoring devices, performance module 42, and/or from controller 32. For example, when in the high-idle mode of operation, based on signals from electrical output sensor 48, performance regulator 44 may affect operation of generator 26 (and, in some instances, of prime mover 24) to thereby increase or decrease an electrical output produced by generator 26. In addition, based on the alarms and/or shutdown command from performance module 42, performance regulator 44 may change (e.g., reduce or increase) or even completely inhibit electrical power production of generator 26. Further, based on commands from controller 32 during the low-idle mode of operation, performance regulator 44 may selectively override the signals from the monitoring devices and/or from performance module 42, and selectively inhibit operation of generator 26 to reduce a load on prime mover 24. In one example, performance regulator 36 may be a voltage regulator commonly known in the art. It should be noted, however, that any of performance module 42, performance regulator 44, and controller 32 may be integrated into a single component, if desired.

Controller 32 may embody a single or multiple microprocessors, field programmable gate arrays (FPGAs), digital signal processors (DSPs), etc. that include a means for controlling an operation of prime mover 24 and/or generator 26 in response to various input. Numerous commercially available microprocessors can be configured to perform the functions of controller 32. It should be appreciated that controller 32 could readily embody a microprocessor separate from that controlling other power system functions, or that controller 32 could be integral with a general power system microprocessor and be capable of controlling numerous power system functions and modes of operation. If separate from the general power system microprocessor, controller 32 may communicate with the general power system microprocessor via datalinks or other methods. Various other known circuits may be associated with controller 32, including power supply circuitry, signal-conditioning circuitry, actuator driver circuitry (i.e., circuitry powering solenoids, motors, or piezo actuators), communication circuitry, and other appropriate circuitry.

Figure 2:
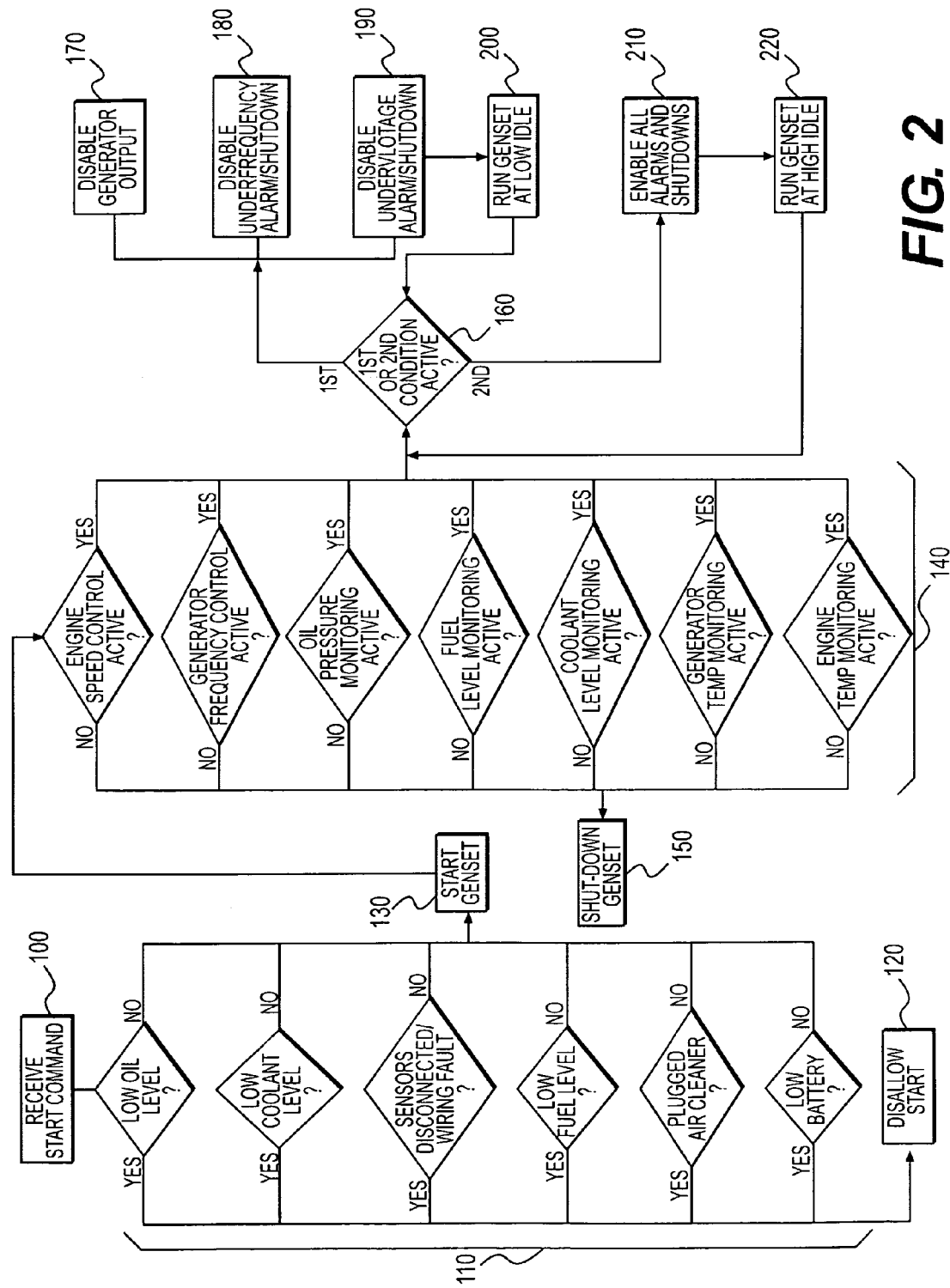
FIG. 2 is a flowchart illustrating an exemplary disclosed method for operating the power system of FIG. 1.

FIG. 2 may illustrate an exemplary operation of power system 10. FIG. 2 will be discussed in more detail in the following section to further illustrate the disclosed concepts.

INDUSTRIAL APPLICABILITY

The disclosed power system may provide multiple modes of operation that serve to protect components of the power system, while helping to ensure power supply readiness. In particular, the disclosed power system may provide a method for warming a genset before use or for maintaining warmth of the genset between uses. By warming the genset or maintaining the warmth of the genset, component life of the genset may be extended and the genset may quickly become ready for full power output. FIG. 2 illustrates a flowchart depicting an exemplary method for operating power system 10 to provide power to external load 12. FIG. 2 will be now be discussed in detail.

During operation of power system 10, controller 32 may receive a request or command to start genset 16 (Step 100). The command may be sent manually, or automatically based on a change in demand from external load 12 or a failure of utility power grid 14. Upon receiving the start command, controller 32 may first establish a current status of genset 16 (step 110). Establishing the status of genset 16 may include determining if an improper oil level, coolant level, or fuel level exists, if any sensors have been disconnected or if a wiring fault exists, if the air cleaner is plugged, if the battery has a low charge, or if another similar condition exists. These conditions may be verified via the monitoring devices associated with prime mover 24 and/or generator 26. If any of these conditions exist, controller 32 may disallow start of genset 16 (Step 120). However, if the current status of genset 16 is acceptable, controller 32 may start prime mover 24 (Step 130).

After startup of prime mover 24, controller 32 may establish a status of performance modules 34, 42 and performance regulators 36, 44 (Step 140). In particular, controller 32 may determine if an engine speed control function of performance regulator 36 is active, if a frequency control function of performance regulator 44 is active, if oil pressure monitoring is active, if fuel level monitoring is active, if coolant level monitoring is active, if generator temperature monitoring is active, and/or if engine temperature monitoring is active. If any of these things are not active, controller 32 may shut down operation of genset 16 (Step 150).

If all of the items checked in step 140 are active and fully functional, controller 32 may then determine if the first or second condition of switching device 30 is active (Step 160). That is, controller 32 may determine if switching device 30 is in the first or second positions, indicating the desire for the low- or high-idle modes of operation. If switching device 30 is in the first position (i.e., the first condition is active), controller 32 may then disable generator output (i.e., disable operation of performance regulator 44 to inhibit conversion of mechanical output to electrical power) (Step 170), disable under-frequency and under-voltage alarm/shutdown capabilities of performance module 42 (Steps 180, 190), and direct performance regulator 36 to operate prime mover 24 at a reduced output (e.g., at low idle conditions) (Step 200). Control may then cycle back to step 160 to determine if the first or second condition still exists.

If at step 160, the second condition exists (i.e., if switching device 30 has been manually moved to the high-idle position, the temperatures of prime mover 24 and/or generator 26 are within an acceptable range, a desired amount of time has elapsed since startup of prime mover 24, etc.), controller 32 may then enable all alarms and shutdowns previously disabled to affect the operation of prime mover 24 (i.e., the combusting of fuel and air to generate the mechanical output) and of generator 26 (i.e., the converting of the mechanical output to electrical power) (Step 210), and run genset 16 at high-idle conditions to increase the mechanical output of prime mover 24 and allow the conversion of mechanical output to electrical power by generator 26 (Step 220). After changing operation of genset 16 to the high-idle condition (i.e., the second condition of switching device 30), control may cycle back to step 160 to determine if the status of switching device 30 has changed.

It should be noted, that while some alarms and shutdown commands may be overridden and/or disabled during the first condition of switching device 30, other alarms and shutdown commands may remain active regardless of the condition of switching device 30. For example, alarms and/or shutdowns associated with overspeeding of prime mover 24, over frequency or voltage of generator 26, over temperature of prime mover 24 or generator 26, fuel levels, oil pressures, coolant levels, and other similar genset parameters may remain active during any condition of switching device 30, while alarms and shutdowns associated with under-frequency and/or under-voltage events may be overridden only during the first condition.

The disclosed power system may help protect the components of genset 16 by providing appropriate controls, alarms, and shutdown, and the ability to override some of these mechanisms during the first condition of switching device 30 (i.e., during a warmup time period). Further, the disclosed power system may provide for operation in the warmup mode during extended periods of time when electrical power from genset 16 is not required.

It will be apparent to those skilled in the art that various modifications and variations can be made to the disclosed power system. Other embodiments will be apparent to those skilled in the art from consideration of the specification and practice of the power system disclosed herein. It is intended that the specification and examples be considered as exemplary only, with a true scope of the disclosure being indicated by the following claims and their equivalents.

What is claimed is:

1. A power system, comprising:
an engine;
a generator mechanically driven by the engine to produce electrical power directed to an external load;
a monitoring device configured to monitor a performance of the generator and to generate a signal indicative of the performance;
a performance module configured to selectively provide at least one of an alarm and a shutdown command to the engine based on the signal from the monitoring device; and
a switching device having at least a first condition and a second condition,
wherein:
when the first condition of the switching device is active, output from the performance module is overridden; the engine is operated at a reduced speed and load output, and the generator is inhibited from producing electrical power; and
when the second condition of the switching device is active, the performance module is allowed to affect operation of the power system, the engine is operated at an elevated speed and load output, and the generator is allowed to produce electrical power directed to the external load.

2. The power system of claim 1, further including:
a performance regulator configured to adjust operation of at least one of the engine and the generator based on the signal from the monitoring device; and
a controller in communication with the engine, the generator, the performance module, the switching device, and the performance regulator, the controller being configured to override the performance module and deactivate the performance regulator to inhibit the generator from producing power.

3. The power system of claim 2, wherein the controller is further configured to automatically change a status of the switching device between the first condition and the second condition.

4. The power system of claim 3, wherein the controller is configured to change the status of the switching device based on a time duration following startup of the engine.

5. The power system of claim 3, further including a temperature sensor associated with one of the engine and the generator, wherein the controller is configured to change the status of the switching device based on a signal from the temperature sensor.

6. The power system of claim 1, wherein the switching device is manually moved between the first and second conditions.

7. The power system of claim 1, wherein the performance of the generator is one of a voltage output and a frequency output of the generator.

8. The power system of claim 1, further including:
a second monitoring device configured to monitor a condition of the engine and generate a second signal indicative of the condition; and
a second performance module configured to selectively provide at least one of an alarm and a shutdown of the engine based on the second signal during the first and the second conditions of the switching device.

9. The power system of claim 8, wherein the condition is one of an oil level, a coolant level, a fuel level, an air cleaner status, and a battery status.

10. A method of providing power, comprising:
combusting a mixture of fuel and air to create a mechanical output;
converting the mechanical output to electrical power;
monitoring a characteristic of the electrical power;
generating at least one of an alarm and a shutdown command based on the monitored characteristic;
overriding the at least one of the alarm and the shutdown command, reducing the mechanical output, and inhibiting the conversion of the mechanical output to electrical power during a first mode of operation; and
affecting at least one of the combusting and the converting based on the at least one of the alarm and the shutdown command, increasing the mechanical output, and allowing the conversion of the mechanical output to electrical power during a second mode of operation.

11. The method of claim 10, further including automatically changing operation between the first mode and the second mode based on a time duration following engine startup.

12. The method of claim 10, further including automatically changing operation between the first mode and the second mode based on an engine temperature.

13. The method of claim 10, wherein operation is manually changed between the first mode and the second mode.

14. The method of claim 10, wherein the monitored characteristic of the electrical power include at least one of a voltage and a frequency.

15. The method of claim 14, wherein overriding the at least one of the alarm and the shutdown command includes overriding the at least one of the alarm and the shutdown command only when the characteristic indicates an under-frequency or an under-voltage event.

16. The method of claim 10, further including:
monitoring an engine condition;
generating at least one of a second alarm and a second shutdown command based on the monitored engine condition; and
affecting at least one of the combusting and the converting based on the at least one of the second alarm and the second shutdown command during any of the first and second modes of operation.

17. The method of claim 16, wherein the monitored engine condition is one of an oil level, a coolant level, a fuel level, an air cleaner status, and a battery status.

18. A power system, comprising:
an engine;
a generator mechanically driven by the engine to produce electrical power directed to an external load;
a monitoring device configured to monitor at least one of a voltage and a frequency of the generator and to generate a corresponding signal;
a voltage regulator configured to affect performance of at least one of the engine and the generator based on the signal;
a manual switch having a first position and a second position; and
a controller in communication with the engine, the generator, the monitoring device, the voltage regulator, and the manual switch, the controller being configured to:
selectively provide at least one of an alarm and a shutdown command to the engine based on the signal;
override the signal and deactivate the voltage regulator when the manual switch is in the first position; and
allow the voltage regulator to affect operation of the power system when the manual switch is in the second position.

19. The power system of claim 18, further including a second monitoring device configured to monitor a condition of the engine and generate a second signal indicative of the condition, wherein the controller is further configured to provide at least one of an alarm and a shutdown of the engine based on the second signal, and to affect operation of the power system based on the second signal when the manual switch is in any of the first position and the second position.

20. The power system of claim 19, wherein the condition is one of an oil level, a coolant level, a fuel level, an air cleaner status, and a battery status.

\* \* \* \* \*